United States Patent
Rogers et al.

(10) Patent No.: US 6,840,699 B2
(45) Date of Patent: Jan. 11, 2005

(54) CONNECTIONS FOR GEOMETRIC MODELING KIT

(75) Inventors: Steven F. Rogers, Longmont, CO (US); Paul R. Hildebrandt, Longmont, CO (US)

(73) Assignee: Zometool, Inc., Denver, CO (US)

( * ) Notice: Subject to any disclaimer, the term of this patent is extended or adjusted under 35 U.S.C. 154(b) by 56 days.

(21) Appl. No.: 10/286,030

(22) Filed: Nov. 1, 2002

(65) Prior Publication Data

US 2004/0086327 A1 May 6, 2004

(51) Int. Cl.⁷ ................................................ F16D 3/00
(52) U.S. Cl. ..................... 403/217; 403/218; 403/171
(58) Field of Search .................... 403/217, 218, 403/219, 169, 170, 171, 172, 173, 174, 176, 175; 446/120

(56) References Cited

U.S. PATENT DOCUMENTS

| | | | |
|---|---|---|---|
| 1,425,234 A | 8/1922 | Bordas | |
| 3,341,989 A | 9/1967 | Emmerich | |
| 3,510,962 A | 5/1970 | Sato | |
| 3,600,825 A | 8/1971 | Pearce | |
| 3,632,147 A | * 1/1972 | Finger | 403/217 X |
| 3,722,153 A | 3/1973 | Baer | |
| 3,854,255 A | 12/1974 | Baker | |
| 4,258,513 A | 3/1981 | Bergman | |
| 4,271,628 A | 6/1981 | Barlow | |
| 4,326,354 A | 4/1982 | Hagberg | |
| 4,348,830 A | 9/1982 | Hagberg | |
| 4,974,986 A | * 12/1990 | Cook | 403/218 |
| RE33,785 E | 12/1991 | Hildebrandt et al. | |
| 2002/0110411 A1 | * 8/2002 | Chen | 403/217 |

* cited by examiner

*Primary Examiner*—John R. Cottingham
(74) *Attorney, Agent, or Firm*—Townsend and Townsend and Crew LLP

(57) ABSTRACT

A kit and structures that may be assembled using components of the kit are disclosed. The kit includes structural nodes and structural connections adapted for connecting the structural nodes. Each structural node has a polygonal openings from a central cavity to the outside of the node. Each of the structural connections has an elongated body having two ends from which stubs having a polygonal cross section extend. The stubs include at least one outward dimple positioned so that it resides within the central cavity of a structural nodes when the stub is inserted through one of the polygonal openings with the end of the elongated body abutting the structural node.

20 Claims, 7 Drawing Sheets

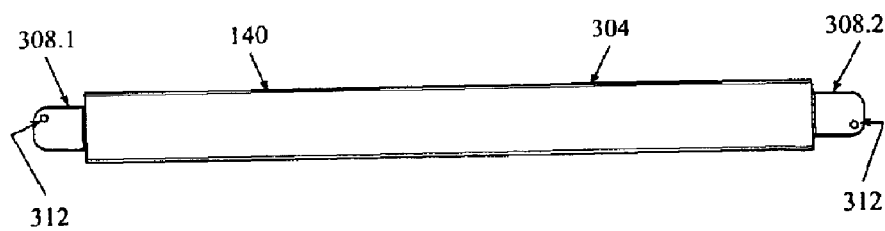
Fig. 3A    Fig. 3B
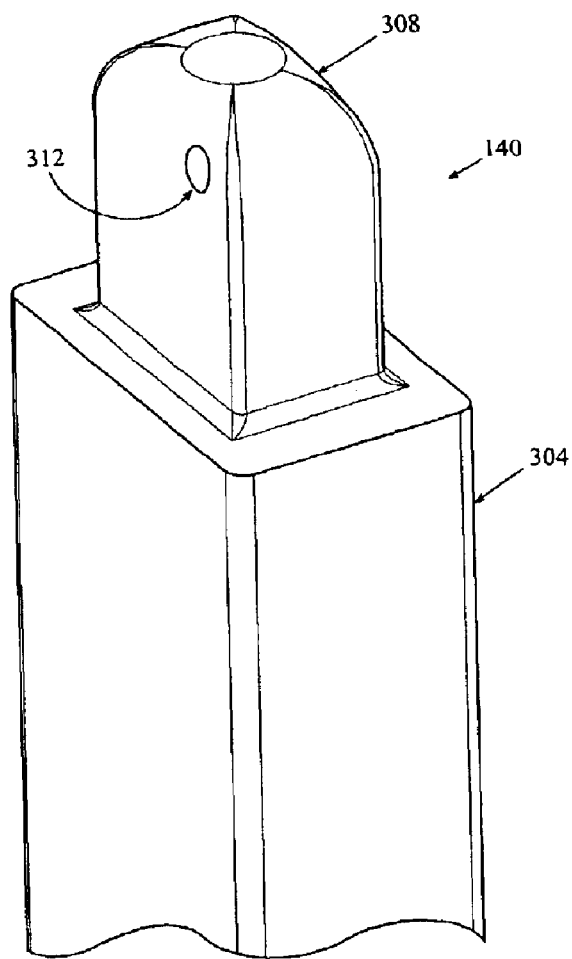
Fig. 3C

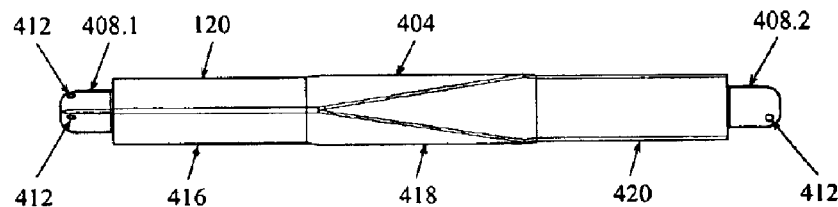 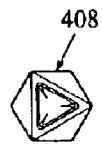
Fig. 4A  Fig. 4B
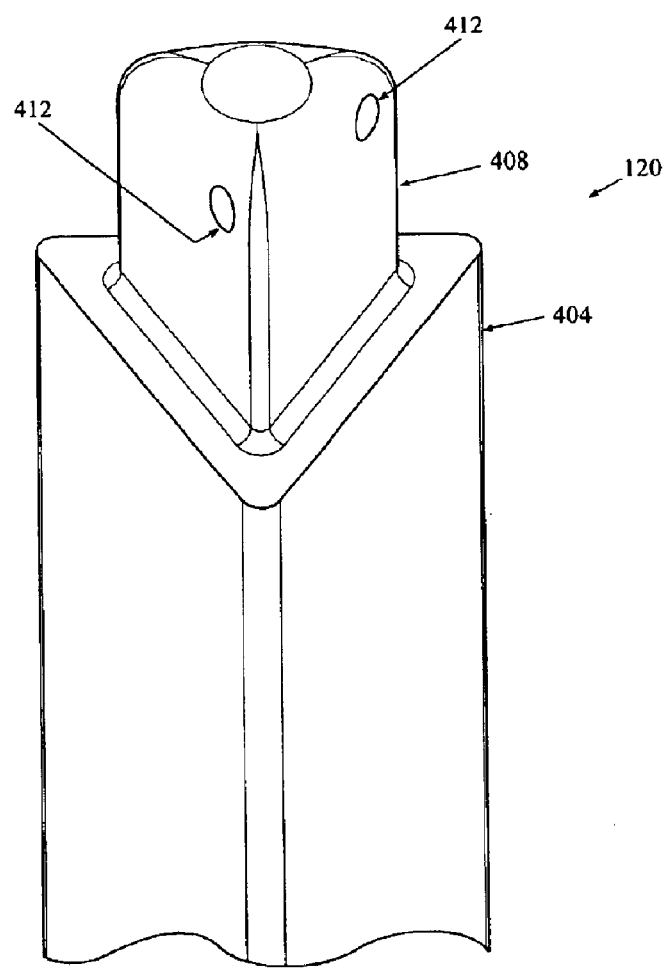
Fig. 4C

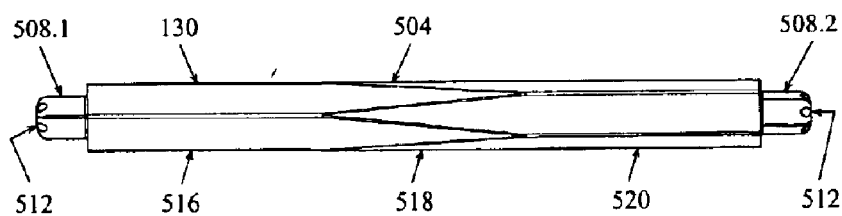
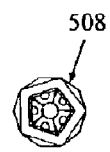
Fig. 5A    Fig. 5B
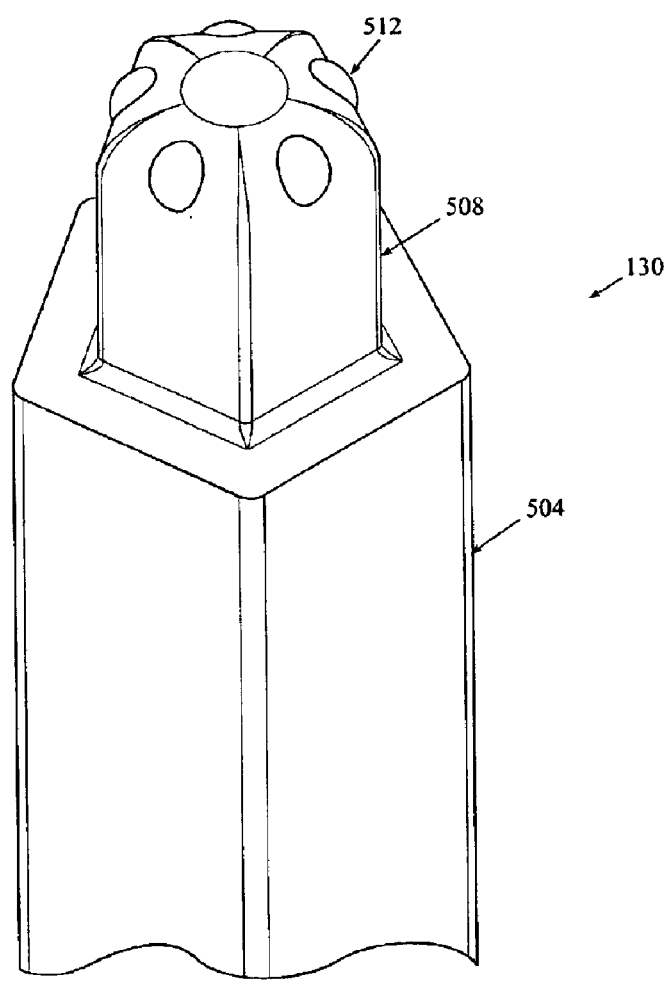
Fig. 5C

CONNECTIONS FOR GEOMETRIC MODELING KIT

BACKGROUND OF THE INVENTION

This application is related generally to geometric structural systems. More specifically, this application is related to geometric modeling kits.

Geometric modeling kits typically comprise a plurality o pieces that may be categorized broadly into two groups: structural nodes and structural connectors. A structural network may be formed from the pieces by interconnecting the structural nodes with the structural connections. For example, U.S. Pat. No. 3,722,153 issued to Stephen C. Baer discloses forming a three-dimensional figure by connection of hall-shaped nodes or connectors and struts into different geometric configurations using the fivefold symmetries of the icosahedron and the dodecahedron. In some instance the structural connections comprise struts, which are elongated structures having ends configured for insertion into selected openings or cavities in the structural nodes. By combining a series of structural nodes and structural connections in different selected angular relationships, a variety of different three-dimensional structures may be constructed. Such geometric modeling kits are commonly used by diverse groups of people, including by children as a form of toy, but also by mathematicians, artists, engineers, and scientists to aid in the study of sophisticated geometric structural systems.

A number of different approaches have been taken to securing the structural connections to the structural nodes, including such inconvenient techniques as welding them together. More commonly, the structural connections and nodes are secured using frictional forces between plastic structures. Plastic is a desirable material for the structural connections and nodes because it is sufficiently flexible to permit deformation of a structural system to allow other components to be added during assembly and is well suited to mass-production molding techniques. When securing the structural connections and nodes with frictional forces, stubs at the ends of structural connections may be formed to have a negative clearance (or interference) with corresponding openings in the structural nodes. However, such a technique results in undesirable stress on models after assembly, increasing the likelihood that some of the components will permanently deform due to stress, and interference makes the models more difficult to build because of resistance to inserting struts in nodes caused by friction. In addition, this resistance may result in incomplete insertion of struts into nodes leading to accumulated dimensional errors that may frustrate users and render larger models difficult or impossible to build.

There is, accordingly, a general need in the art for improved mechanisms for securing components of geometric modeling kits.

BRIEF SUMMARY OF THE INVENTION

Embodiments of the invention thus provide a kit and structures that may be assembled using components of the kit. The kit includes a plurality of structural nodes and a plurality of structural connections adapted for connecting the plurality of structural nodes. Each of the structural nodes has a plurality of polygonal openings from a central cavity to an outside of the structural node. Each of the structural connections has an elongated body having two ends from which stubs having a polygonal cross section extend. The stubs include at least one outward dimple, which is positioned so that it resides within the central cavity of one of the structural nodes when the stub is inserted through one of the polygonal openings with the end of the elongated body abutting the structural node.

In some instances, the stubs may have a plurality of outward dimples. In such cases, the plurality of outward dimples may be formed on different sides of the polygonally shaped stubs. For some of the structural connections, the plurality of outward dimples may also be pinwheeled by displacing the positions of the dimples from the centers of the different sides in a common angular direction. These displacements may be substantially uniform in some embodiments. In other embodiments, the plurality of outward dimples may be positioned at different distances from a respective end of the elongated body.

The stubs may also have a narrowing taper, facilitating their insertion into one of the polygonal openings. The shapes of the stubs, as well as of the openings of the structural nodes, may vary. For example, in one embodiment, a portion of the structural connections have stubs with a rectangular cross section, a portion of the structural connections have stubs with a triangular cross section, and a portion of the structural connections have stubs with a pentagonal cross section. The lengths of the structural connections may also be chosen to met certain desirable geometric constraints. For example, in the embodiment with stubs having rectangular, triangular, and pentagonal cross sections, the lengths of the structural connections having such stubs may respectively be in the proportions $A\tau^n$–N where A is equal to unity, cos 18°, cos 30°, or cos 45°; $\tau = (\sqrt{5}+1)/2$; n= ..., −2, −1, 0, 1, 2, ...; and N is a diameter of the structural nodes.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 3A and 3B are front and end views of a structural connection according to one embodiment of the invention;

FIG. 3C is an orthographic view of an end of the structural connection shown in FIGS. 3A and 3B;

FIGS. 4A and 4B are front and end views of a structural connection according to another embodiment of the invention;

FIG. 4C is an orthographic view of an end of the structural connection shown in FIGS. 4A and 4B;

FIGS. 5A and 5B are front and end views of a structural connection according to a further embodiment of the invention;

FIG. 5C is an orthographic view of an end of the structural connection shown in FIGS. 5A and 5B;

DETAILED DESCRIPTION OF THE INVENTION

Embodiments of the invention provide geometric modeling kits with structural connections that avoid some of the deficiencies of the prior art. The geometric modeling kits may include hollow structural nodes that comprise openings having a plurality of different shapes to accommodate structural connections with differently shaped ends. Stubs at the ends of the structural connections include outward dimples that snap into a central cavity of the structural nodes when inserted into one of the openings. When fully inserted, the structural connections are thereby secured by hooking over a webbing formed between the openings. The outward dimples on the ends of the structural connections may be oriented to avoid interference with dimples of other structural connections when multiple structural connections are secured to a particular structural node. In addition to avoiding stress on assembled models with such an arrangement, the outward dimples ensure positive positioning of the structural connections to reduce or eliminate accumulated errors, even when large models are formed.

Figure 1:
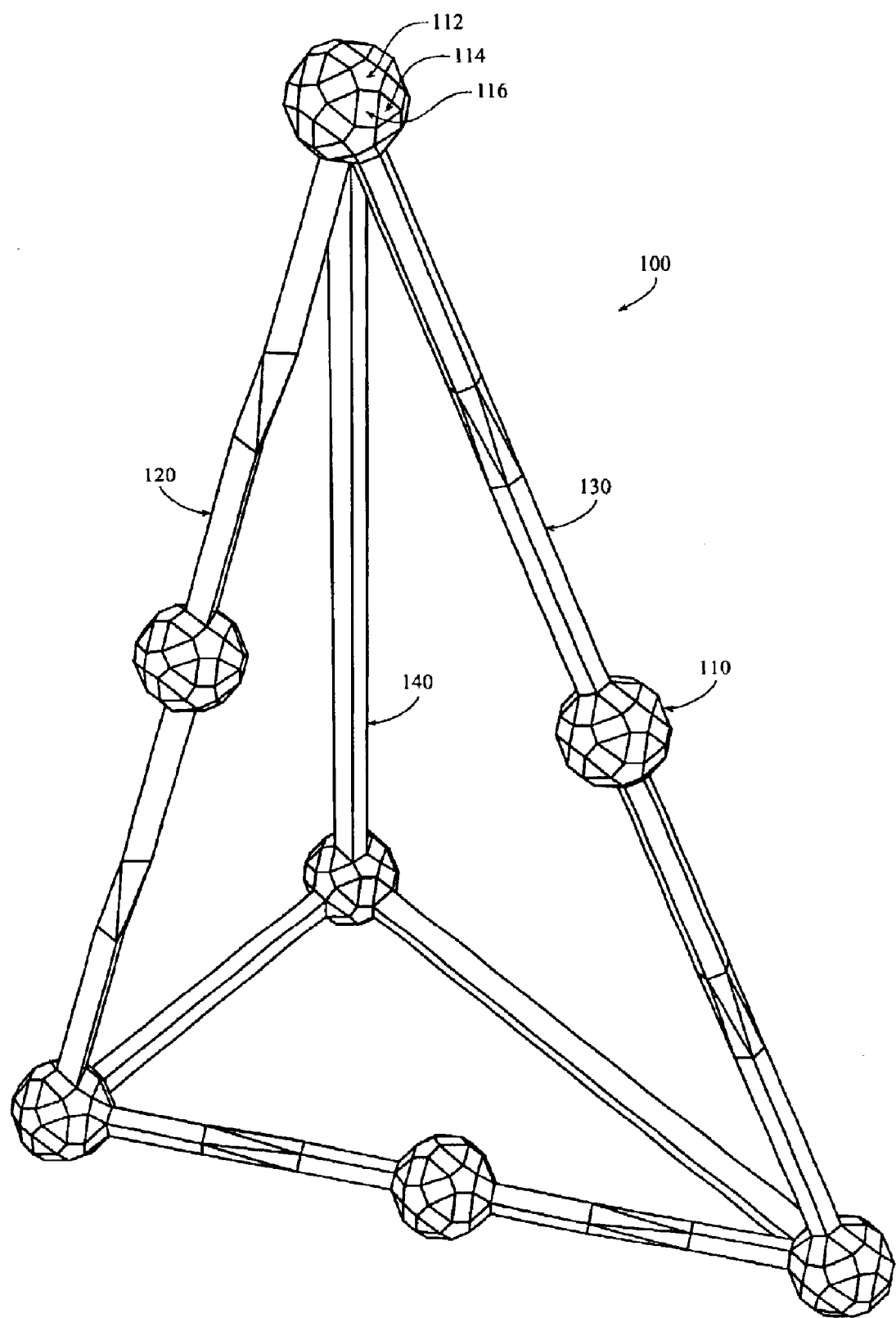
FIG. 1 is a perspective view illustrating a three-dimensional structural network made using structural nodes and structural connections according to an embodiment of the invention.

FIG. 1 provides a perspective view that provides an illustrative example of a three-dimensional structural network 100 made using elements of a geometric modeling kit in accordance with an embodiment of the invention. The structural network comprises a plurality of structural nodes 110 assembled with structural connections 120, 130, and 140. In this embodiment, the structural nodes 110 comprise rhombicosidodecahedra, shown in greater detail in FIGS. 2A and 2B, each of which includes thirty rectangular elements 116, twenty triangular elements 114, and twelve pentagonal elements 112. Structural connections 120 are configured to connect triangular elements 114 of two structural nodes 110, structural connections 130 are configured to connect pentagonal elements 112, and structural connections 140 are configured to connect rectangular elements 116 of two structural nodes 110.

Figure 2A:
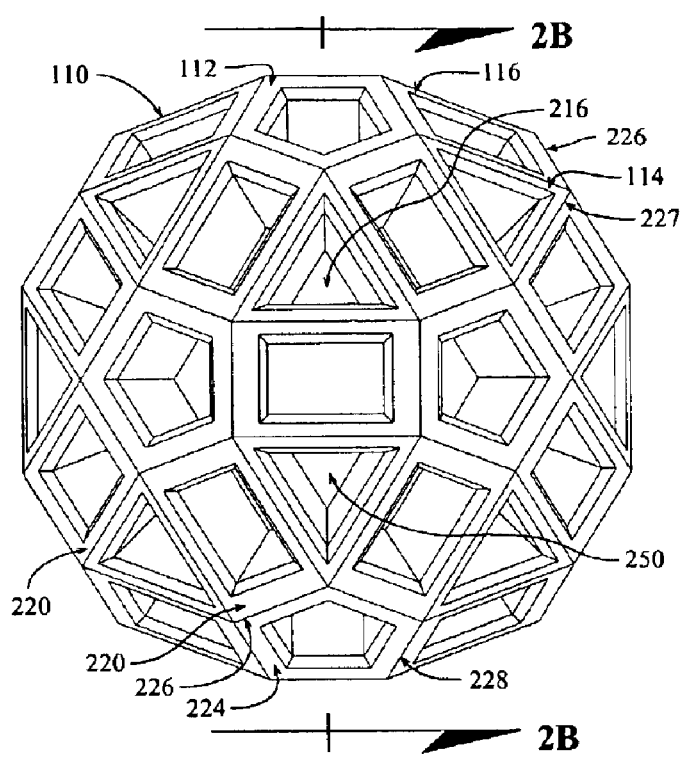
FIG. 2A is a plan view of a structural node according to an embodiment of the invention.
Figure 2B:
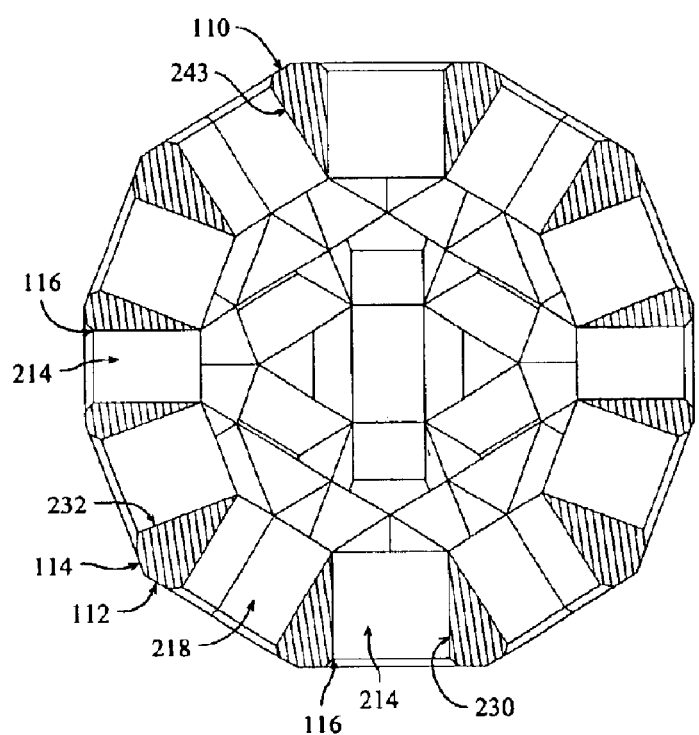
FIG. 2B is a cross-sectional view of the structural node shown in FIG. 2A.

FIGS. 2A and 2B respectively provide plan and cross-sectional views of the structural nodes 110 used in the illustrative example of FIG. 1, with the cross-sectional view of FIG. 2B being along section line 2B—2B of FIG. 2A. Additional details of the such structural nodes 110 is described in U.S. Pat. No. RE33,785, entitled "GEOMETRIC MODELING KIT AND METHOD OF MAKING SAME," issued to Paul R. Hildebrandt and Marc G. Pelletier, which is a reissue patent of U.S. Pat. No. 4,701,131 (collectively referred to herein as "the Hildebrandt patent"), the entire disclosures of both of which are herein incorporated by reference for all purposes. The rectangular, triangular, and pentagonal elements 116, 114, and 112 of the structural nodes 110 are arranged together to form an open shell with a central cavity designated at 250. The resulting structure of the shell is sometimes referred to herein as a "webbing" and may be manufactured from plastics-manufacturing techniques known to those of skill in the art. Openings extending radially from the center of the rhombicosidodecahedron structure are included for each of the component polygonal elements: the rectangular elements 116 have radially extending openings designated 214; the triangular elements 114 have radially extending openings designated 216; and the pentagonal elements have radially extending openings designated 218. The webbing comprises inner edges 230 that surround the openings of the rectangular elements 116, inner edges 232 that surround the openings of the triangular elements 114, and inner edges 243 that surround the openings of the pentagonal elements 112. In addition, the webbing comprises external end faces 220, 222, and 224 that correspond respectively to the rectangular, triangular, and pentagonal elements 116, 114, and 112, and that make up the external surface of the structural node 110. Each end face is interrupted by openings 214, 216, and 218 at their inner edges as described and by outer edges 226, 227, and 228. In the rhombicosidodecahedron shown, the pentagonal elements 112 are bordered by shorter edges of the rectangular elements 116, and opposed longer edges of the rectangular elements 116 are bordered by side edges of triangular elements 114, the structural nodes 110 being symmetrically formed about an imaginary vertical plane passing through their centers, such as represented by section line 2B—2B of FIG. 1A.

Examples of structural connections made in accordance with embodiments of the invention are illustrated in FIGS. 3A–5C. Each of the structural connections includes an elongated body having opposed connecting stubs, the stubs having polygonal cross sections to correspond to the configuration and size of the openings of respective polygonal elements of the structural node 110. The stubs include a narrowing tapered end to facilitate insertion of the stub into the appropriate opening and include one or more outward dimples. The stubs are sufficiently long to extend through the openings into the inner cavity 250 of the structural node 110, with the outward dimples positioned to reside within the inner cavity 250 and thereby hook over the webbing. This provides a connective structure that avoids placing stress on assembled models. In addition, as described in greater detail below, the outward dimples may be configured in a pinwheeled fashion on the stubs to avoid interference with other outward dimples when structures are assembled. The plurality of outward dimples on each of the stubs may also be positioned at different heights along the stubs from ends of the elongated bodies to accommodate variations in the depths of the holes due to manufacturing.

FIGS. 3A–3C provide illustrations of the rectangular-element structural connection 140 used to connect rectangular elements 116 of the structural nodes 110. FIGS. 3A and 3B respectively provide front and end views and FIG. 3C provides an orthographic view of an end of the rectangular-element structural connection 140. This structural connection 140 comprises an elongated body 304 and opposed connecting stubs 308 that have a rectangular cross section. Each of the stubs 308 includes an outward dimple 312 for engagement with the webbing of the structural node 110 when inserted into one of the rectangular openings 214. In one embodiment, outward dimples 312 are formed on both longer edges of the rectangular cross section, the positions of each being displaced in opposite directions from a transverse center line. In some embodiments, the displacements of the outward dimples 312 from such a transverse center line are substantially equal in magnitude. The narrowing taper of the stubs 308, which facilitates insertion into the rectangular openings 214, is visible in the front and perspective views of FIGS. 3A and 3C. The height of each dimple 312 along each face of a given stub 308 may differ to accommodate differences in depths of the webbing.

FIGS. 4A–4C similarly provide an illustration of the triangular-element structural connection 120 used to connect triangular elements 114 of the structural nodes 110. FIGS. 4A and 4B respectively provide front and end views and FIG. 4C provides an orthographic view of an end of the triangular-element structural connection 120. This structural connection 120 comprises an elongated body 404 and opposed connecting stubs 408 that have a triangular cross section. Each of the stubs 408 includes an outward dimple 412 for engagement with the webbing of the structural node 110 when inserted into one of the triangular openings 216. In one embodiment, outward dimples 412 are formed on each of the three sides of the triangular stubs 408 with their positions displaced from the center of each of the stubs 408 in a common angular direction (or pinwheel symmetry). For example, in the end view of FIG. 4B, each of the dimples 412 may be displaced in a clockwise direction from the center of the respective side on which that dimple 412 is formed; alternatively, each of the dimples 412 may be displaced in a counterclockwise direction from the center of the respective side. In some embodiments, the displacements of the dimples 412 from the center of each side are substantially equal in magnitude. The narrowing taper of the stubs 408, which facilitates insertion into the triangular openings 216, is visible in the front and perspective views of FIGS. 4A and 4C. The height of each dimple 412 along each face of a given stub 408 may differ to accommodate differences in depths of the webbing. In addition, the orientation of the triangular stubs 408-1 and 408-2 may differ, such as by being rotated 180° relative to each other about a central axis through the length of the elongated body 404. In one embodiment, such a relative orientation is achieved with an elongated body 404 having two end sections 416 and 420 that are similarly shaped but rotationally displaced by 180° relative to each other by a common intermediate section 418. A flat side of one of the end sections may taper along the intermediate section 418 into a vertex at the outer end section.

FIGS. 5A–5C illustrate the application of the same principles to the pentagonal-element structural connection 130 used to connect pentagonal elements 112 of the structural nodes. FIGS. 5A and 5B respectively provide front and end views and FIG. 5C provides a perspective view of an end of the pentagonal-element structural connection 130. This structural connection 130 comprises an elongated body 504 and opposed connecting stubs 508 that have a pentagonal cross section. Each of the stubs 508 includes an outward dimple 512 for engagement with the webbing of the structural node 110 when inserted into one of the pentagonal openings 218. In one embodiment, outward dimples 512 are formed on each of the five sides of the pentagonal stubs 508. For a rhombicosidodecahedral structural node 110, the sides of each pentagonal element 112 are adjacent only to the shorter sides of rectangular elements 116; this means that pinwheeling of the positions of the outward dimples 512 is unnecessary to avoid interference when dimples 312 for the rectangular-element structural connection 140 are positioned only on the long sides of the rectangles. It may, however, be desirable to pinwheel the dimples in a fashion similar to that described with respect to the triangular-element structural connection 120 for different configurations of the structural nodes 110. As for the other structural connections, the stubs may include a narrowing taper to facilitate their insertion into the pentagonal openings 218, as illustrated in FIGS. 5A and 5C. If multiple dimples are included, such as on each side of a stub 508, they may be positioned at different heights along the stubs 508 to accommodate differences in thickness of the webbing. Also, the orientation of the pentagonal stubs 508-1 and 508-2 may differ, such as by being rotated 180° relative to each other about a central axis through the length of the elongated body 504. In one embodiment, such a relative orientation is achieved with an elongated body 504 having two end sections 516 and 520 that are similarly shaped but rotationally displaced by 180° relative to each other by a common intermediate section 518. A flat side of one of the end sections may taper along the intermediate section 518 into a vertex at the outer end section.

Figure 6:
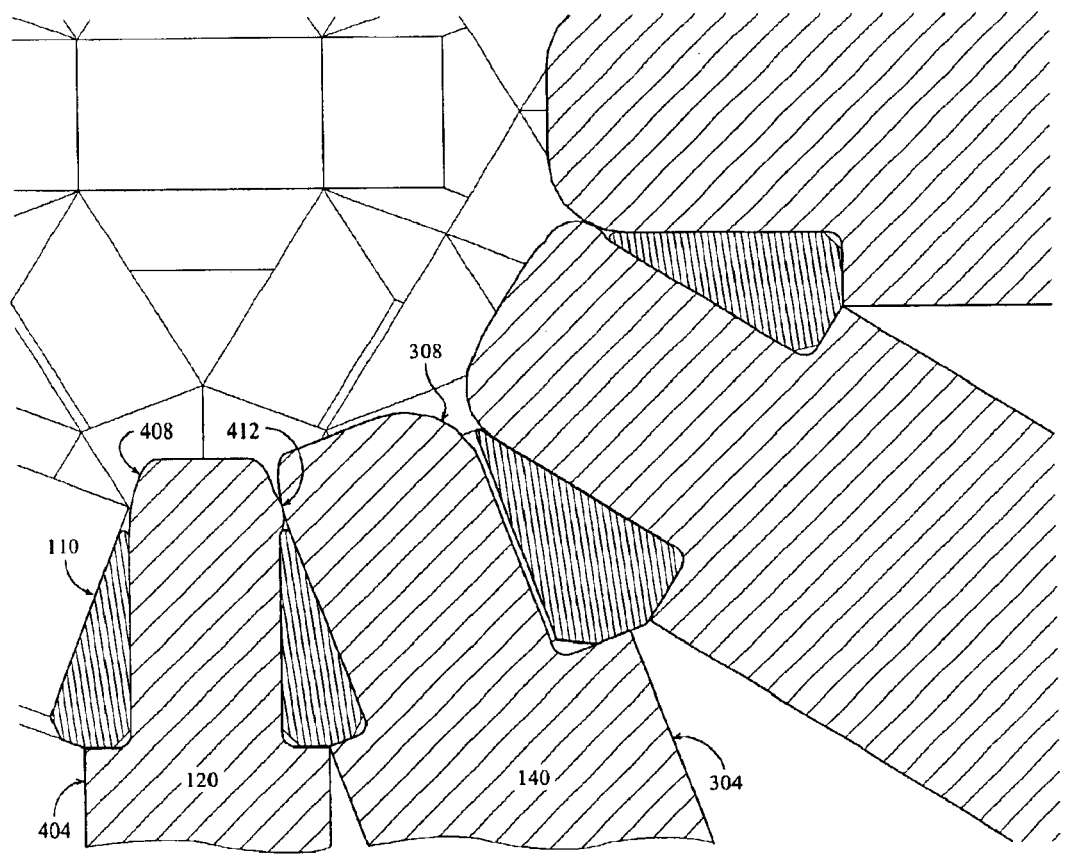
FIG. 6 is a cross-sectional view illustrating a geometric relationship between structural connections when secured to a common structural node.
Figure 7:
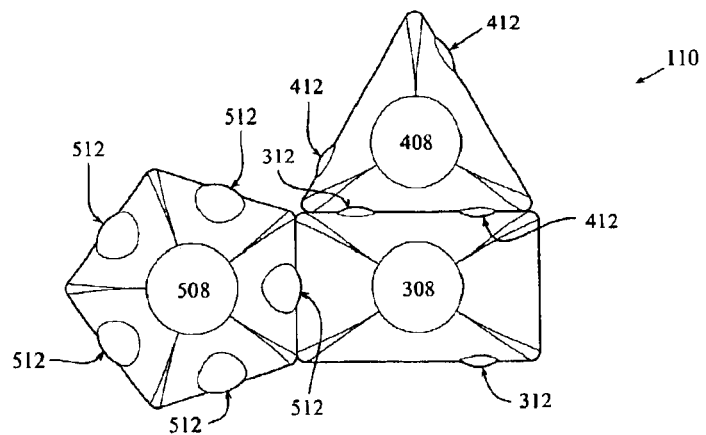
FIG. 7 is a schematic representation illustrating pinwheeling of outward dimples for clearance is assembled structures.
Figure 8:
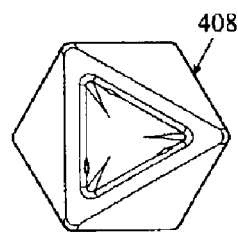
FIG. 8 provides views of a structural connection illustrating compensation for irregularities in the structural node according to an embodiment.
Figure 8:
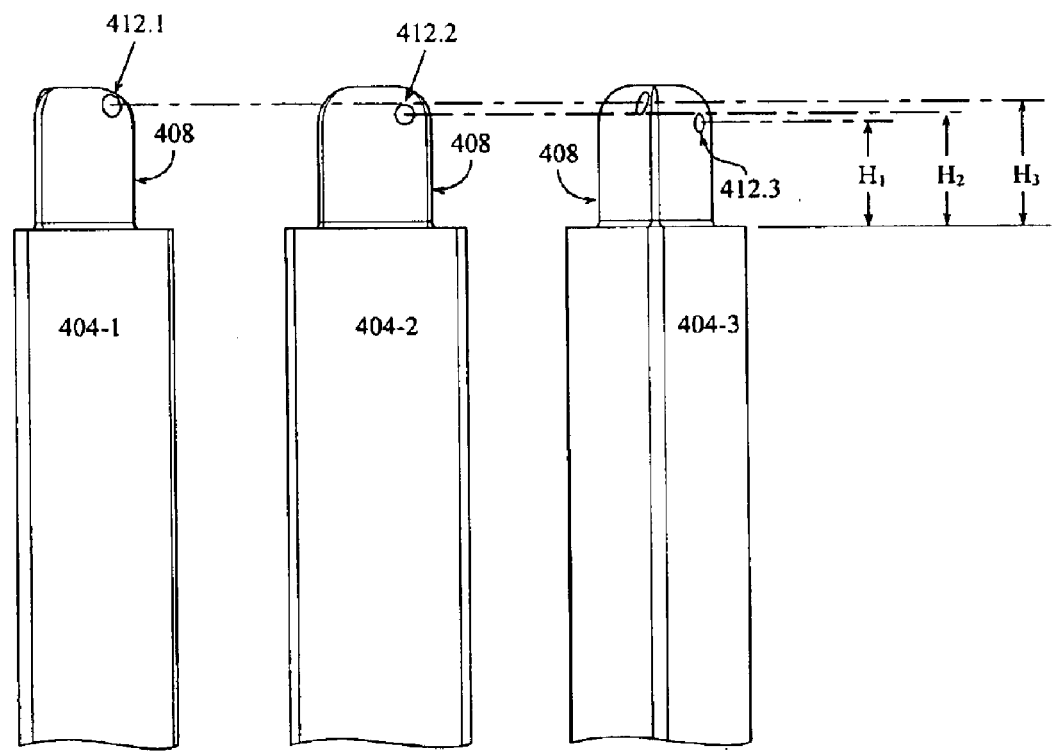

The manner in which a number of the features discussed above interact when a model is assembled using the structural nodes 110 and structural connections is illustrated with FIGS. 6–8. In FIG. 6, a cross-sectional view is provided of a section of an assembled model showing two structural connections and a portion of the webbing of one of the structural nodes 110. The two structural connections shown include a rectangular-element structural connection 140 and a triangular-element structural connection 120, although the illustrated features apply general to any combination of structural connections. The elongated bodies 304 and 404 of the structural connections are positioned outside the structural node 110, with the stubs 308 and 408 protruding through openings in the webbing to the central cavity 250. An outward dimple 412 comprised by the triangular-element structural connection 120 is visible in the drawing just inside the central cavity 250.

The configuration shown in FIG. 6 may be achieved by inserting each of the structural connections through a respectively shaped opening until the structural connection clicks into place with the dimple residing in the central cavity 250. In this position, the structural connection is secured by the webbing of the structural mode 110. The connection is most secure when the end of the elongated body 404 and the dimple 412 abut opposite sides of the webbing. One advantage to this configuration is that the structural connection may be secured without the need for a groove in the structural node 110 to hold the dimple 412. Because of the pinwheeling orientation of the dimples, no corresponding dimple for the rectangular-element structural connection 140 interferes with the dimple 412 that is visible in FIG. 6.

The avoidance of interference between dimples of proximate structural connections when they are secured by the structural node is more evident from FIG. 7, which provides an internal perspective view of a structural node 110 with various secured structural connections. This view may be considered as looking at ends of structural connections from the central cavity 250 of the structural node 110, with other portions of the structural node 110 being shown in shadow line. The interaction of the dimples for the various structural connections is illustrated at a position where the three different structural connections are adjacent. Thus, FIG. 7 shows three stubs with different adjacent polygonal cross sections: (1) the stub 308 of a rectangular-element structural connection 116 with dimples 312 on the two long sides of the stub 308; (2) the stub 408 of a triangular-element structural connection 114 with dimples 412 on all three sides of the stub 408; and (3) the stub 508 of a pentagonal-element structural connection 112 with dimples 512 on all five sides of the stub 508. The lack of interference among the dimples for the different structural connections is a consequence of the pinwheeling configuration described above. For the rhombicosidodecahedral structure, the only edge interfaces presented are rectangle (long side)/triangle interfaces and rectangle (short side)/pentagon interfaces. This configuration may thus arrange dimples 512 without pinwheeling if there are no dimples on the short sides of stub 308. In other structures for the structural node 110, different polygonal interfaces may be presented and may use the pinwheeling configuration.

In FIG. 6, the dimple 412 on stub 408 is shown well positioned for securing the structural connection 120 by abutting the inside of the webbing at the same time the end of the elongated body abuts the outside of the webbing. In manufacturing processes, however, there may be some variation in the thickness of the webbing between openings. The ability to accommodate such variation is illustrated in FIG. 8 when a stub includes a plurality of dimples. In FIG. 8, this is illustrated for a triangular-element structural connection by showing the positions of three outward dimples 412 on the three sides of the triangular stub, with the three sides of the elongated body being denoted 404-1, 404-2, and 404-3. The positions of the outward dimples 412 differ on the three sides by being positioned at three different heights $H_1$, $H_2$, and $H_3$ along the stub 408 from the end of the elongated body. This variation in height increases the likelihood that at least one of the dimples will substantially abut the webbing as shown in FIG. 6 even if there are small variations in the thickness of the webbing.

In some embodiments, the lengths of the structural connections may be chosen to meet certain geometrical constraints. For example, in one embodiment, the relative lengths are governed by the divine proportion $\tau=(1+\sqrt{5})/2 \approx 1.61804$. This may be achieved by defining the rectangular-element structural connections 116 as having a unit length, with the triangular-element structural connections 114 having lengths that are T powers of cos 30° times the unit length and the pentagonal-element structural connections 112 having lengths that are T powers of cos 18° times the unit length. In dimensional geometry, the rectangular, triangular, and pentagonal elements correspond to the numbers two, three, and five respectively so as to establish a proper relationship between the shape and intended function of each structural connection in assembling into different three-dimensional figures. This may be appreciated from a consideration of the assembly of the structure shown in FIG. 1. When assembled, the structural connections 140, 120, and 130 have their connecting ends inserted into the openings of the structural-node elements 116, 114, and 112. The rectangular-element structural connections 140 define a cube and the triangular-element structural connections 120 define a rhombic dodecahedron. Other lengths for the structural connections may correspond to higher or lower powers of T, with distances measured from structural-node centers so that the actual length of the structural connections is equal to the center-to-center distance less a node diameter. This may be summarized in the following table:

| No. | Stub Shape | Length |
| --- | --- | --- |
| 2 | Rectangle | $\tau^n$ × Node Diameter |
| 3 | Triangle | $\tau^n$ × cos 30° × Node Diameter |
| 5 | Pentagon | $\tau^n$ × cos 18° × Node Diameter |

A variety of applications of these geometrical relationships are discussed in the Hildebrandt patent. Such geometrical relationships may also be studied with the improved connectivity enabled by the preceding disclosure. The Hildebrandt patent also describes molding techniques that may be used in fabricating the structural nodes and/or the structural connections. The invention is not limited by the technique used to fabricate the component structures and any suitable technique known to those of skill in the art may be used, including injection-molding, blow-molding, thermoforming, rotational-molding, extrusion, and other techniques.

Thus, having described several embodiments, it will be recognized by those of skill in the art that various modifications, alternative constructions, and equivalents may be used without departing from the spirit of the invention. For example, while the above description has focused on a geometry that corresponds to the use of a rhombicosidodecahedral structural node, other embodiments may implement other geometries. Moreover, while the presentation of embodiments of the invention has been guided by applications to a geometric modeling kit, it will be appreciated by those of skill in the art that there are a number of other useful applications, including space-frame-structure and design applications, among others. Accordingly, the above description should not be taken as limiting the scope of the invention, which is defined in the following claims.

What is claimed is:

1. A structure comprising:
    a plurality of structural nodes, each such structural node having plurality of polygonal openings from a central cavity to an outside of the structural node; and
    a plurality of structural connections connecting the plurality of structural nodes, each such structural connection having:
      an elongated body having two ends;
      stubs extending from each end of the elongated body, wherein the stubs have a polygonal cross section; and
      an outward dimple on each stub,
    wherein, for each structural connection, at least one of the stubs is inserted through one of the polygonal openings of one of the structural nodes such that corresponding end of the elongated body abuts that structural node and the outward dimple is within the central cavity of that structural node.

2. The structure recited in claim 1 wherein a first portion of the structural connections have stubs with a rectangular cross section, a second portion of the structural connections have stubs with a triangular cross section, and a third portion of the structural connections have stubs with a pentagonal cross section.

3. The structure recited in claim 2 wherein lengths of the structural connections define separations between centers of the structural nodes in the proportions $A\tau^n$–N, where A is equal to unity, cos 18°, cos 30°, or cos 45°; $\tau=(\sqrt{5}+1)/2$; n= . . . , –2, –1, 0, 1, 2, . . . ; and N is a diameter of the structural nodes for structural connections with stubs having rectangular, triangular, and pentagonal cross sections respectively.

4. The structure recited in claim 1 wherein the outward dimple comprises a plurality of outward dimples.

5. The structure recited in claim 4 wherein, for at least a portion of the structural connections, each of the plurality of outward dimples is formed on a different side of a respective stub.

6. The structure recited in claim 5 wherein positions of the plurality of outward dimples are displaced from centers of the different sides of the respective stub in a common angular direction.

7. The structure recited in claim 6 wherein positions of the plurality of outward dimples are displaced substantially uniformly from the centers.

8. The structure recited in claim 5 wherein at least two of the plurality of outward dimples are positioned at different distances from a respective end of the elongated body.

9. The structure recited in claim 1 wherein the stubs have a narrowing taper.

10. The structure recited in claim 1 wherein each of the structural nodes comprises a rhombicosidodecahedron.

11. A kit comprising:
a plurality of structural nodes, each such structural node having a plurality of polygonal openings from a central cavity to an outside of the structural node; and
a plurality of structural connections adapted for connecting the plurality of structural nodes, each such structural connection having:
an elongated body having two ends;
stubs extending from each end of the elongated body, wherein the stubs have a polygonal cross section; and
an outward dimple on each stub positioned a distance from a respective end of the elongated body to reside within the central cavity of one of the structural nodes when such each stub is inserted through one of the polygonal openings of the one of the structural nodes with the respective end abutting the one of the structural nodes.

12. The kit recited in claim 11 wherein a first portion of the structural connections have stubs with a rectangular cross section, a second portion of the structural connections have stubs with a triangular cross section, and a third portion of the structural connections have stubs with a pentagonal cross section.

13. The kit recited in claim 12 wherein lengths of the structural connections define separations between centers of the structural nodes in the proportions $A\tau^n - N$, where A is equal to unity, cos 18°, cos 30°, or cos 45°; $\tau = (\sqrt{5}+1)/2$; n= . . . , −2, −1, 0, 1, 2, . . . ; and N is a diameter of the structural nodes for structural connections with stubs having rectangular, triangular, and pentagonal cross sections respectively.

14. The kit recited in claim 11 wherein the outward dimple comprises a plurality of outward dimples.

15. The kit recited in claim 14 wherein each of the plurality of outward dimples is formed on a different side of a respective stub.

16. The kit recited in claim 15 wherein, for at least portion of the structural connections, positions of the plurality of dimples are displaced from centers of the different sides of the respective stub in a common angular direction.

17. The kit recited in claim 16 wherein positions of the plurality of outward dimples are displaced substantially uniformly from the centers.

18. The kit recited in claim 15 wherein at least two of the plurality of outward dimples are positioned at different distances from a respective end of e elongated body.

19. The kit recited in claim 11 wherein the stubs have a narrowing taper.

20. The kit recited in claim 11 wherein each of the structural nodes comprises a rhombicosidodecahedron.

* * * * *